July 5, 1938.
T. L. SHEPHERD
2,122,726
IMPROVED METHOD OF MAKING OR PRODUCING
ELASTIC THREADS OF RUBBER OR THE LIKE
Filed April 4, 1935
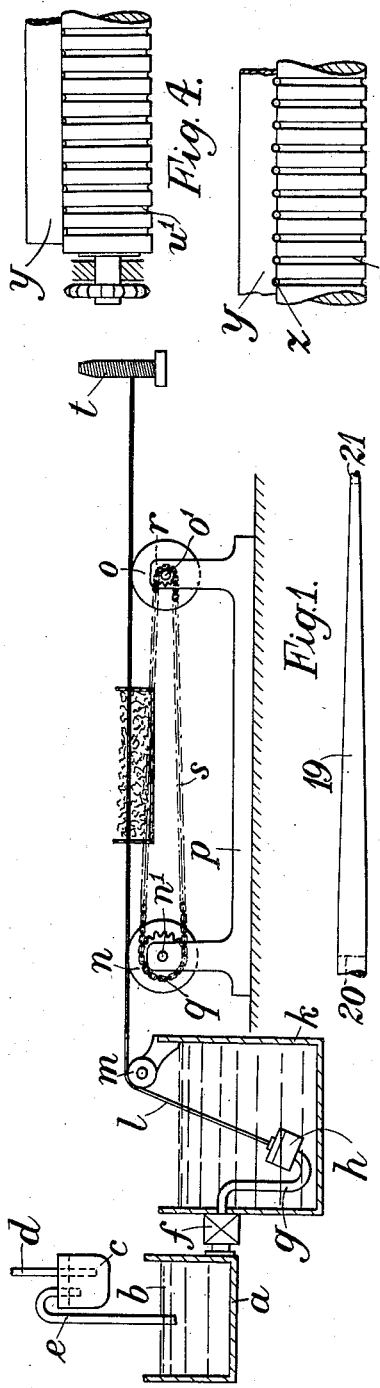
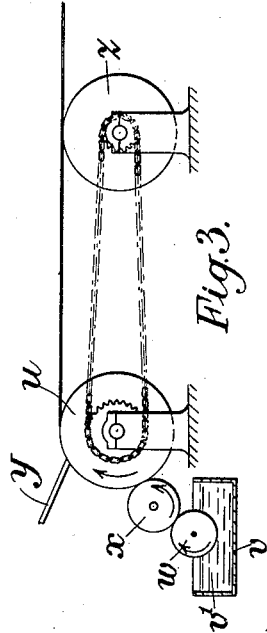
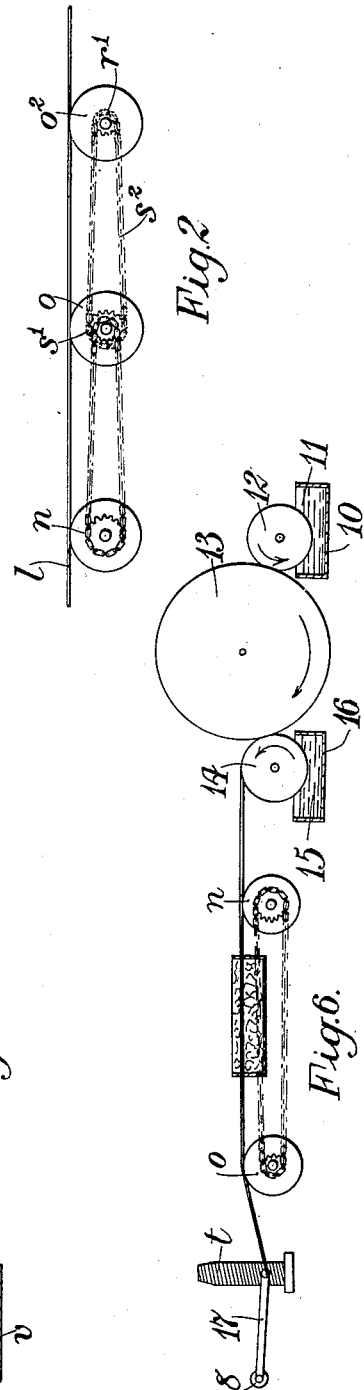
T. L. Shepherd
INVENTOR
By Glascock Downing & Seebold
Attys.

Patented July 5, 1938

2,122,726

UNITED STATES PATENT OFFICE 2,122,726

IMPROVED METHOD OF MAKING OR PRODUCING ELASTIC THREADS OF RUBBER OR THE LIKE

Thomas Lewis Shepherd, London, England

Application April 4, 1935, Serial No. 14,694
In Great Britain April 6, 1934

8 Claims. (Cl. 18—8)

This invention relates to rubber or elastic threads which may be used in the manufacture of textile goods such as woven or knitted fabrics, braided material, lace or otherwise.

In the methods of manufacture hitherto adopted for the production of rubber threads, they have largely been made or prepared by being extruded from a nozzle, which is fed with a suitable liquid, or by cutting strips from a sheet of rubber. By known methods of extruding the liquid, there is produced a series of undulations which are extremely minute in character but nevertheless have the effect that when utilized in the manufacture of a fabric have a tendency to produce an intercutting action by the crossing threads. Also in the production of cut threads similar surface irregularities are produced which have the same drawback.

Another drawback associated with known methods of extrusion involves the feature that the thread has a spongy surface, which also reacts subsequently to destroy the threads.

In any of the methods hitherto adopted the result has been to obtain a thread which has an externally roughened surface, which is undesirable because such irregularities tend to produce afterwards a broken yarn.

One object of the present invention is to produce a rubber or elastic thread which shall not possess such an irregular surface, but one which is smooth and uniform in character. Another object of the invention is to produce a rubber or elastic thread which does not necessitate (before it is woven into a fabric) being covered with a suitable protective coating or fibrous covering, as has been necessary hitherto. Another object of the invention is to produce a rubber or elastic thread of much finer count than has hitherto been produced and a still further object of the invention is the production of such a thread at a greater speed, or conversely, in a shorter space of time.

It may be stated in the production of fine counts of these rubber threads that the stretch has been hitherto obtained after coagulation has been completed. A further object of the present invention is to obtain this reduction of diameter before the coagulating period has been completed, or whilst the thread is being coagulated. By effecting this reduction during coagulation it is possible to obtain a much greater reduction in diameter, owing to the fact that the rubber is still in the process of being coagulated and may, therefore, be acted upon in the direction of extending a thread and at the same time reducing its diameter.

The invention principally consists in a method of manufacturing rubber elastic threads consisting in bringing a moving thread of rubber into contact with a coagulating medium or in bringing a moving thread of coagulant into contact with a liquid rubber mix, and subsequently whilst in a state of partial coagulation, subjecting the thread to a stretching operation so as to impart to it a desired diameter.

The invention also consists in a new article of manufacture comprising a thread, the diameter of which has been obtained by stretching a thread of rubber in a state of partial coagulation, vulcanization being subsequently effected.

The invention will now be described with reference to the accompanying drawing, in which:

Figure 1 is a diagrammatic view of an apparatus for manufacturing a thread according to the invention;

Figure 2 is a modified detail;

Figure 3 is a diagrammatic view of another form of apparatus for manufacturing thread according to the invention;

Figure 4 is an enlarged view of a printing roller forming part of the apparatus shown in Figure 3;

Figure 5 is a modified detail of the printing roller shown in Figure 4;

Figure 6 is a further diagrammatic view of another form of apparatus for producing a thread;

Figure 7 is an enlarged view of a thread during the process of manufacture, and

Figure 8 is a similar view of a thread but in which the rubber is mixed with finely divided or comminuted material.

In carrying the invention into effect with reference to Figure 1 for the production of a rubber or elastic thread, a suitable mixture of either natural or artificial dispersion of latex, Revertex or similar rubber mixture is contained in a bath $a$.

The mixture of latex or the like $b$ contained in the bath $a$ is kept at a constant level by the usual well known device comprising an upper tank $c$ into which a supply of the liquid rubber such as $b$ is led by pipe $d$ and a syphon tube $e$ leads the mixture from tank $c$ into the tank $a$ so that it is maintained at a constant level. From the tank $a$ the liquid rubber solution is pumped by means of a pump $f$ into a tube $g$ leading to the usual extrusion nozzle $h$, such device being immersed in a tank $k$ containing a suitable coagulating liquid of the usual kind. From the nozzle $h$ a thread $l$ is discharged and passes through the body of coagulating liquid in tank $k$ and after passing over a roller $m$ in a partially coagulated condition, it is led on to a roller $n$ and from thence on to another roller $o$.

The rollers $n$, $o$ are supported in suitable bearings upon shafts $n^1$, $o^1$ by a frame $p$ and such rollers are driven at a differential speed by means of a sprocket wheel $q$ on the spindle $n^1$ and a corresponding sprocket wheel of smaller diameter $r$ on spindle $o^1$. These two sprocket wheels are operated by a sprocket chain or the like $s$ and the roller $n$ is driven by any suitable source of power, not shown.

In this way and by the gear ratio depending upon the relative sizes of the sprocket wheels $q$ and $r$, the roller $o$ is caused to rotate at a higher peripheral speed than the roller $n$ whereby the thread $l$ which is travelling over the rollers receives a continued stretching movement in the direction of its length, whereby its diameter amongst other things is reduced to the desired size and in this way a very fine denier or count of thread is obtained.

In the space between the rollers $n$ and $o$ the thread is conducted through a heated body of chalk or other suitable powder or anti-adhesive material for the purpose of both assisting the drying of the thread as well as preventing adhesion.

Moreover, by means of gaseous or heat treatment, coagulation may be further promoted between these two rollers and after leaving the roller $o$ the thread thus produced and having the desired diameter is then completely coagulated and vulcanized and may be then wound direct onto a pirn, bobbin or the like as shown at $t$.

It will be understood that any suitable guide may be used to ensure the proper and regular helical winding of the thread upon the pirn $t$.

Thus from the foregoing, it will be understood that as the thread issues from the nozzle $h$ it is under a certain amount of head pressure so that extrusion is accomplished and as the thread passes through the coagulating bath in the tank $k$, it is led onto the rollers $n$ and $o$ so that the thread will be subjected to a differential stretching movement in the direction of its length in order that the thread which is still in the process of being coagulated may be tensioned. It is to be noted that instead of the rollers $n$, $o$ a moving blanket or belt may be used.

The resultant thread has therefore been differentially extended in the manner described and owing to this extension being effected whilst coagulation is still incomplete, a much finer count can be produced than hitherto without interfering with its final elasticity. By choosing and adjusting the differential speeds any suitable degree of reduction in diameter may be effected and it has been found that by such differential extension, the irregularities that have been present in such threads hitherto are now smoothed out or eliminated whereby a surface is obtained which will be more regular and uniform than hitherto.

It will be understood that the thickness of the final yarn or thread and its extensibility can be varied according to a number of factors, that is to say, by a suitable choice of the nozzle or orifices through which the solution is extruded; the character of the coagulating bath; the distance through which the thread is passed in the coagulant and the differential speeds obtained on the moving surfaces over which the extruded thread is passed. Another factor which may be taken into account is the character and nature of the initial mixture which is extruded. It may be stated as the invention is thus far described, that the differential stretch to which the partly completed thread is subjected entails a progressive reduction in thickness between that which issues from the coagulating bath and the final product, and it will be understood that any irregularities of the surface which the thread acquires during extrusion and coagulation are changed by the differential extension, from transverse irregularities into longitudinal flutes, so that the resultant thread has its irregularities smoothed out and has a surface which is regular and uniform. Moreover it is found that during the progress of coagulation and the differential stretching exerted upon the thread, the exterior of the thread changes its character during its progression, so that it becomes relatively tougher than the internal portion of the thread and the toughness of the external zone of the thread increases. The resulting thread is thereby provided, as it were, with a hard and tough skin and is also smooth and uniform in size, whereby it is no longer necessary to provide it with a protective coating or fibrous covering as hitherto before it can be woven or formed into the fabric desired. There is thus automatically imparted to the thread its own protective characteristic, which overcomes the necessity for an additional permanent protective covering.

It is moreover to be observed that the thread thus far completed, if it is removed from the surface over which it has been travelling, will have no tendency to contract; it simply maintains its status of manufacture. The thread thus formed may now be led away or treated in situ, in order that it may be properly dried and vulcanized.

It is interesting to note that by the process above described of stretching the thread, the whole structure of the thread is densified, that is to say, particles are co-ordinated and brought closer together and tend to become compressed, with the result that the external zone of the thread is hardened and strengthened. It is also interesting to note that by coagulating the outer surface of the elastic thread before any appreciable stretch takes place the original shape of the thread leaving the orifice (e. g. round, flat, or the like) can be substantially retained. The various devices that are used in the manufacture of such rubber thread may vary according to the circumstances of any particular case desired for manufacture of the threads, for example, the moving surfaces may comprise either rotating rollers, or may comprise moving belts, blankets or other surfaces, which are driven at the differential speeds desired, and it will be appreciated that any number of threads may be manufactured at a time.

Referring to Figure 2, an example is here shown of means whereby additional progressive stretching may be exerted upon the thread $l$. In addition to the two rollers $n$ and $o$, shown in Figure 1, there is added a further roller $o^2$ and these are connected by sprocket gearing after the manner shown in Figure 1, an additional sprocket wheel $r^1$ being mounted upon the spindle of the additional roller $o^2$. The spindle of the roller $o$ carries a sprocket wheel $s^1$ corresponding to $r^1$ and a sprocket chain or the like $s^2$ connects these two sprocket wheels, thus giving a further gear ratio, whereby the roller $o^2$ is driven at a still faster speed.

Another system of manufacturing such threads is shown in Figure 3 and comprises a roller $u$ bearing a number of circumferential grooves $u^1$ (see Figure 4) arranged side by side thereon and into which grooves liquid rubber is fed, as will be described so that a series of threads of any number arranged in parallel form and in spaced relation may be produced.

For this purpose, a tank $v$ is arranged to contain a supply of the liquid rubber solution $v^1$ and into this there dips a roller $w$ so that a film of the solution is by means of the transfer roller $x$ passed onto the surface of the printing roller $u$. Coacting with such roller there is a doctor blade or equivalent apparatus $y$ by which the liquid is properly guided into the grooves $u^1$ so that they shall be properly filled, and if desired, the action of the doctor blade can smooth the surface of each liquid stream to the shape of the groove in the roller, and a groove also may be made in the doctor as shown at $z$ in Figure 5 so that the doctor blade and the grooves together complete the section of thread which is desired. The threads which are thus obtained in parallel spaced relation are subjected to the same differential stretch that has been above described by causing the thread from the printing roller $u$ to pass onwards over roller $z$, these two rollers $u$ and $z$ being driven at differential speeds by sprocket gear such as is shown in Figure 1.

It will be understood that a chalk or other material bath as indicated in Figure 1, may be also used in the arrangement shown in Figure 3.

Referring to the modification shown in Figure 6, in this case a tank 10 is adapted to contain an acid or other coagulating liquid 11 and dipping into such liquid is a roller 12, which roller is in running contact with a disc 13, so that the disc after receiving a thread of acid from the roller 12, will as it continues to rotate, make contact with a roller 14 which is caused to dip into a liquid rubber solution of the kind above referred to contained in a tank 16.

As the thread of coagulating liquid reaches the roller 14, upon which there is already a thread of liquid rubber, the latter thread becomes coagulated and this is then carried off from the roller 14 to the stretching device as by rollers $n$ and $o$, similar to the manner described in Figure 1.

After leaving the roller $o$ the thread after suitable finishing treatment is led direct to a pirn or bobbin $t$, the usual oscillating guide 17 pivoted at 18 being used to control the regular winding of the thread on the bobbin or pirn $t$.

Figure 7 illustrates a thread produced according to the invention on a very enlarged scale, and the tapering part 19 illustrates the stretch which has been applied to reduce its diameter from the initial dimension at 20 to the final dimension shown for example at 21.

It is to be moreover understood that the coagulation period should preferably commence directly the thread has passed the doctor blade $y$ in the apparatus shown in Figure 3. Any suitable means may be used for the purpose of coagulation, such as heated air or gases. In ordinary circumstances of working, after the thread has been formed in the grooves $u^1$ of the roller $u$ and has left them, it will be desirable to remove any excess of coagulant that may be left and otherwise cleanse the surface of the roller so as to thereby prevent any undesirable matter or liquid from becoming entrained into the coagulum.

In a further suitable application of the method, the thread may be suitably dyed or otherwise treated and this can be effected either by mixing the dyeing or other compounds with the original or initial solution to be extruded and/or adding the dyeing components to the coagulating bath itself, adding such components to the coagulating bath and/or placing them in the powder container through which the partially coagulated thread is drawn.

In an alternative system of obtaining a dyed thread, the initial liquid to be extruded may be mixed with comminuted or finely divided fibres or dust, either white or coloured, and this will have an influence on the final thread produced.

Figure 8 shows a view on a magnified scale of such a thread, the stippling shown indicating the comminuted or finely subdivided material. In this way therefore the material forming the thread is of a compound character in that it will be partly of rubber and partly of fibrous material which will have the dual effect of diminishing the stretch of the final product and increasing its propensity to absorb ordinary textile dyestuff.

What I claim is:

1. A method of manufacturing rubber thread, which comprises bringing latex and coagulant together, forming a thread of partially coagulated coagulum in which coagulation proceeds, stretching such thread before the coagulation of the thread is complete, and allowing the coagulation to become complete after the stretching operation is finished.

2. A method as claimed in claim 1, in which further coagulating processes are applied to the thread of partially coagulated coagulum while it is being stretched.

3. Apparatus for manufacturing rubber thread, which comprises a roller with grooves, means for applying latex to the roller, a doctor blade for removing latex from the roller except in the grooves, means for in part coagulating the latex, and means for stretching the partially coagulated coagulum.

4. Apparatus as claimed in claim 3, in which the doctor blade is shaped and arranged so that grooves or notches in the blade register with the grooves in the roller.

5. A method as claimed in claim 1 in which the thread after being stretched is wound onto a support and is then vulcanized upon the support.

6. Apparatus for manufacturing rubber thread, which comprises means for forming a latex composition into a thread, means for partially coagulating the thread, means for stretching the partially coagulated thread, and means for drying the thread during the stretching operation.

7. Apparatus for manufacturing rubber thread, which comprises means for forming a latex composition into a thread, means for partially coagulating the thread, means for stretching the partially coagulated thread, and means for coagulating uncoagulated latex in the thread during the stretching operation.

8. A method of manufacturing rubber thread which comprises bringing a latex composition and coagulant together, forming a thread of partially coagulated coagulum in which coagulation proceeds, stretching such thread before the coagulation is complete, allowing the coagulation to become complete after the stretching is finished and vulcanizing the completely coagulated thread.

THOMAS LEWIS SHEPHERD.